Sept. 16, 1958 C. W. COMBS 2,852,706

SWITCHING APPARATUS

Filed July 10, 1956 3 Sheets-Sheet 1

INVENTOR.
CHARLES W. COMBS
BY
Carl H. Synnestvedt
AGENT

INVENTOR.
CHARLES W. COMBS
BY
Carl H. Synnestvedt
AGENT

Sept. 16, 1958 C. W. COMBS 2,852,706

SWITCHING APPARATUS

Filed July 10, 1956 3 Sheets-Sheet 3

INVENTOR.
CHARLES W. COMBS

BY Carl H. Synnestvedt

AGENT 2,852,706

SWITCHING APPARATUS

Charles W. Combs, Rowland Park, Cheltenham, Pa., assignor to Philco Corporation, Philadelphia, Pa., a corporation of Pennsylvania Application July 10, 1956, Serial No. 596,886

5 Claims. (Cl. 307—150)

The switching apparatus of the present invention has been developed primarily in order to insure greater personal safety, together with simplicity of operation and maintenance, in the use of portable broadcast receivers, such as radio receivers; and, while the invention can be used with advantage in other types of electrical apparatus, it will be specifically described as incorporated in a portable radio.

A basic object of the present invention is, to combine and arrange certain switches—particularly those known in the radio art as A. C./D. C. switches and interlock switches— so as to automatically obtain by a single manipulation not only a normal electrical control effect, such as A. C./D. C. selection, but also safety with respect to possible electric shock in the case of inadvertent contact with parts which may be connected to a power line or A. C. line. This safety is of practical importance mainly in those frequent instances where a receiver or the like must be opened from time to time, incident to which the user may come into contact with parts which may carry dangerous electrical charges. A typical instance of this kind occurs in the use of a portable radio with A. C. connector cord, when the cabinet is opened in order to store the cord therein.

A particular object is, so to arrange a combined electrical control and safety switch and actuator for the same as to eliminate the danger referred to, particularly by combining the switch actuator with a closure element, such as the movable back panel of a portable radio.

Accordingly a preferred embodiment of the invention comprises a two-position actuator for a multiple contact switch, for instance a slider which can be moved in one direction by a simple clip attached to the conventional, movable closure member of the receiver and which then resiliently actuates the combined A. C./D. C. and safety switch, for instance through a compression spring; the slider being suitably biased in order to be normally returned by a tension spring or the like, when the closure is opened. A contact carrier of the switch, while being resiliently movable by the slider with respect to stationary switch contacts, can be locked against such movement, by the connector plug for connection of the system to the A. C. line, when this plug is stored in the cabinet and properly positioned for battery operation of the system.

The exact arrangement of the various parts, positions and operations will be understood more clearly upon a perusal of the detailed description which follows. In the drawing.

Figure 1:
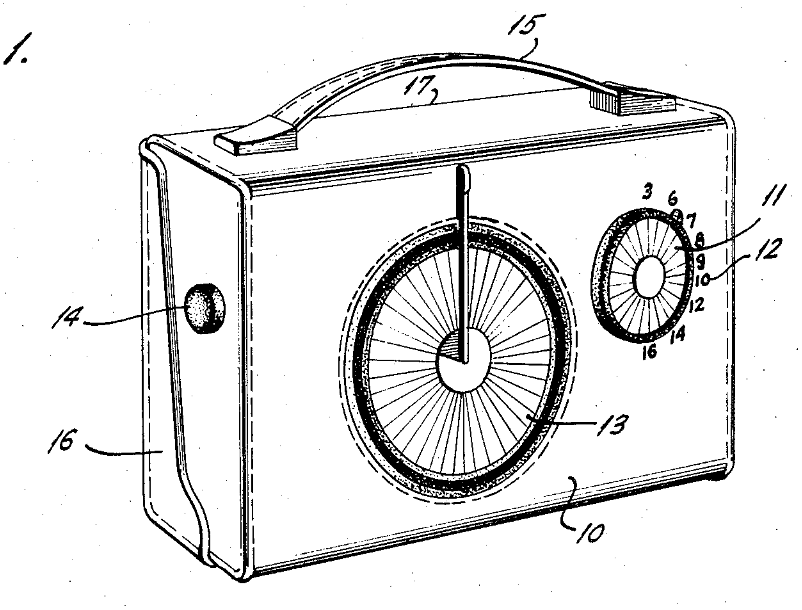
Figure 1 is a perspective view of one type of portable radio receiver which may be equipped with switching means according to the present invention, the receiver being shown in its normal condition for battery operation, with the A. C. cord stored in the cabinet.

In Figure 1 there is shown a portable radio receiver which may have a conventional front panel 10, tuning knob 11, dial 12, speaker front 13, off-on switch 14 and carrying handle 15. A closure member 16 is shown as being swingably secured to the back of the cabinet, by a hinge member or hinge line 17 which may extend along the top of the cabinet and which in some cases may simply be provided by a suitably flexing portion of a cabinet wall, formed of leather or other flexible material.

Figure 2:
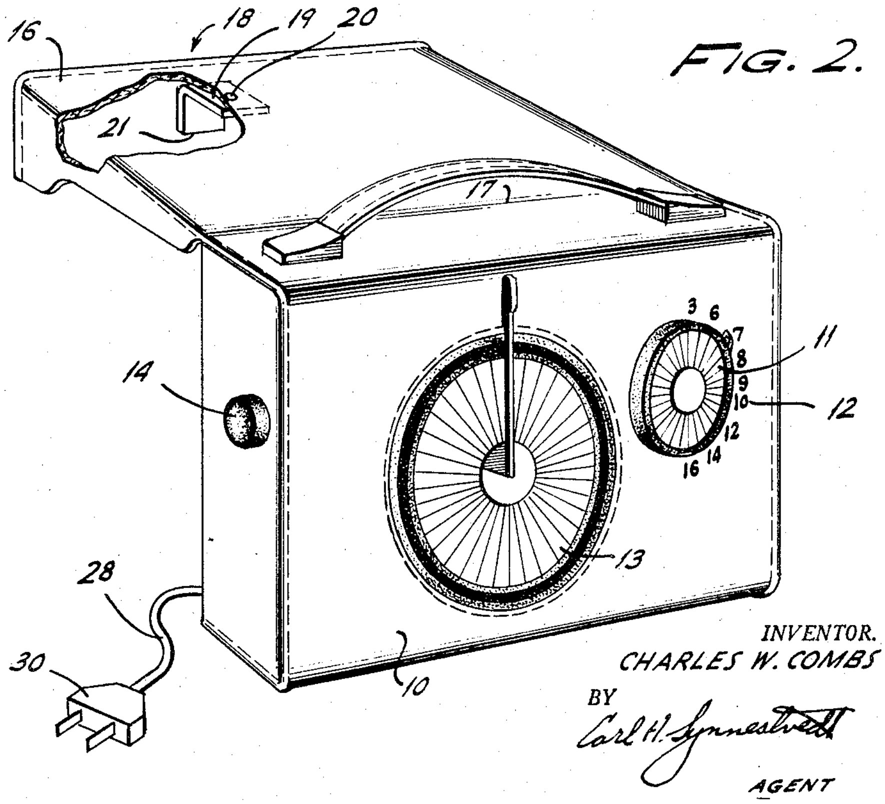
Figure 2 is a similar view of the same receiver, showing the back closure member opened and the cord partly taken out for A. C. operation.
Figure 3:
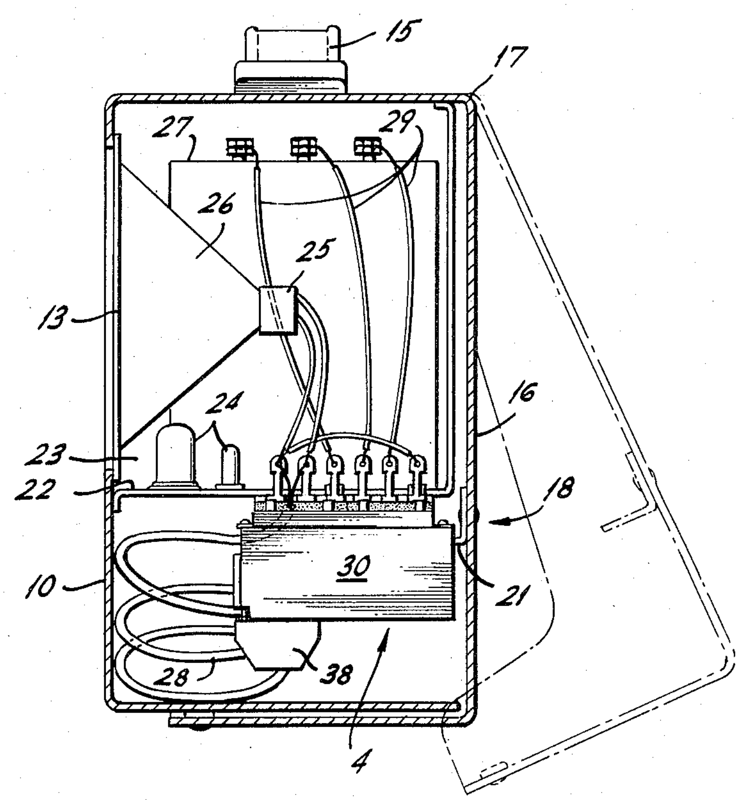
Figure 3 is a diagrammatic, vertical section through the receiver, showing the general location and arrangement of the switch, the actuator and the stored A. C. cord.

This closure 16 carries the primary switch actuator member provided according to the present invention; and this member is shown in Figure 2 as comprising a small, angular clip 18, having a first leg 19 secured to the inside of the back 16, by rivet means 20, and having a second leg 21 disposed at right angles to the back 16 and projecting inwardly and forwardly, relative to the radio cabinet; see Figure 3.

As shown in the last mentioned figures, closure of the back panel 16 swings the actuator leg 21 of clip 18 into an innermost, switch-actuating position, slightly below the web 22 of a chassis 23. The chassis may have conventional component mounted thereon, for instance (Figure 3) tubes 24 of a signal channel and associated circuitry for feeding signals, selected by turning knob 11 (Figure 2), to the driving element 25 of a speaker 26 (Figure 3). As usual in portable radios this system is supplied with D. C. power, by a dry battery unit 27, or with rectified A. C. power, by a common domestic current supply outlet, not shown; provision being made to connect the A. C. supply to the system by the aforementioned cord of conductors which is shown at 28 and which has one end permanently attached to the chassis 23 for A. C. operation. On the other hand, D. C. operation is provided by the battery 27, which can be connected to the chassis through other conductors 29 within the receiver; also see Figure 8. In order to selectively complete receiver circuits including either the supply of A. C. power or that of D. C. power, and for other purposes to be mentioned presently, a combined selector and safety switch unit 4 is provided, in cooperative relation with the switch actuator clip 18 on back panel 16. As shown in Figure 3, the switch unit 4 is secured to the underside of the chassis member 22, adjacent the innermost or "closed" position of the clip 18.

Figure 8:
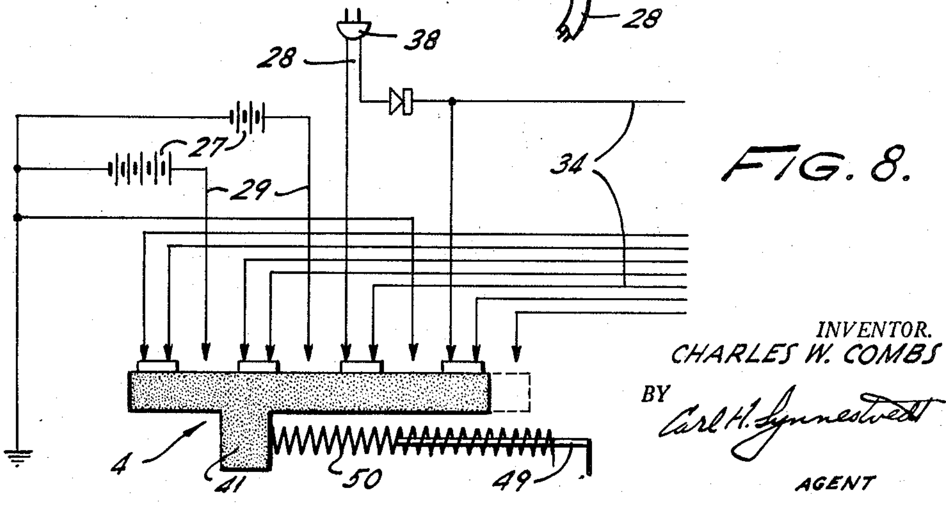
Figure 8 is a circuit diagram of the switch.

The selection of D. C. power or of the relatively dangerous A. C. power involves the making and breaking of a somewhat complex system of branch circuits, a well-known form of which is illustrated in Figure 8. For various reasons, including economy and specialization of switch constructions, it has been usual thus far to minimize the number of the making and breaking operations and elements of an A. C./D. C. switch and to rely on a separate, so-called interlock switch for safety purposes. As a result it was thus far possible, and in fact usual, to leave at least one of the two or more A. C. lines connected to certain points on the chassis, even when operative A. C. connection was broken by the A. C./D. C. switch. Since the A. C. source and the points connected thereto may be at relatively high and dangerous potential, such as one hundred and fifteen volts, the so-called interlock switch was heretofore provided for completely disconnecting all A. C. power lines from the receiver during maintenance operations; however, an extra manipulations was required for this purpose. Therefore the system was far from being safe during such operations, including not only the aforementioned storing of the A. C. connector cord but also, for instance, the removal or changing of dry batteries.

The present switch 4 and actuator 16, 18 automatically perform the safety interlocking in effective conjunction with a simple A. C./D. C. cycle; and they perform this safety function prior to the moment when danger can be incurred; that is, incident to the opening and closing of the cabinet containing the A. C.-connecting power cord 28. This arrangement greatly enhances the safety of operation of the device.

Figure 4:
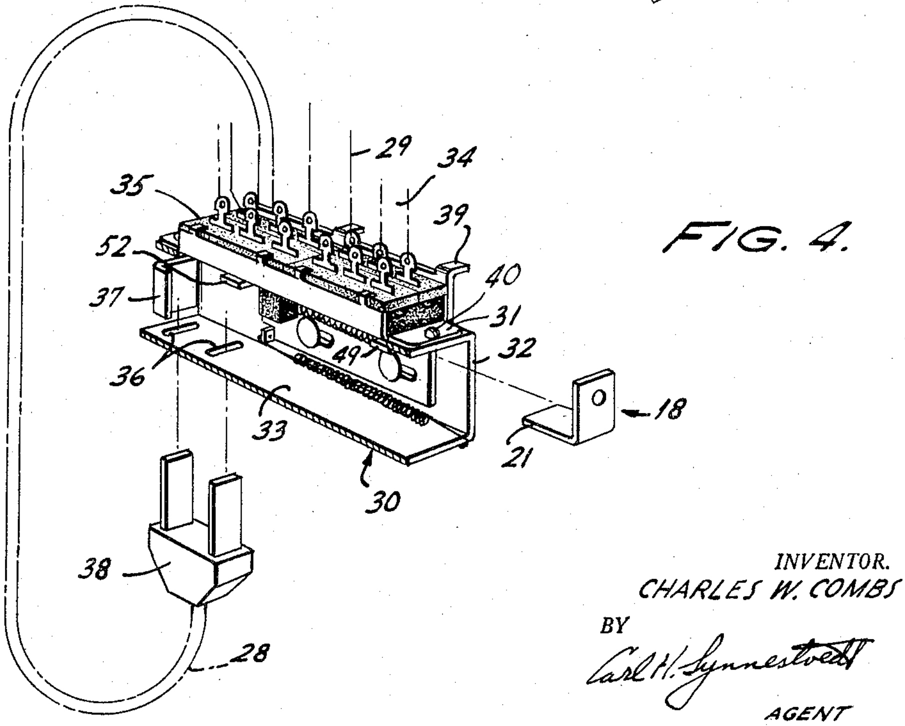
Figure 4 is a persepctive view of the switch, the actuator and the cord, with a cover plate of the switch broken off.

A preferred form of the switch unit 4 is shown in some detail in Figure 4. It comprises a generally box-shaped shell 30, which is normally closed but is here shown with a front plate removed, thereby disclosing: an upper, contact-supporting wall 31, a vertical, slider-supporting wall 32, and a lower, plug-supporting wall 33. The upper wall 31 supports the stationary and normally movable terminals for the power and battery conductors 28, 29, as well as those for cooperating conductors 34 leading to the electrical system of chassis 23; the normally movable terminals or contactors being secured to an insulating part of a multiple pole, double throw switch 35, shown as being of the sliding contact type. According to the invention the normally movable contactors can be immobilized, and for this purpose the lower or plug-supporting wall 33 provides a pair of apertures 36, adapted with the help of an end wall 37 to guide and hold a common two-pronged connector plug 38, which is attached to the free end of the power cord 28 and can be inserted in said apertures, with effects to be explained presently. The slider wall 32 is provided with tab members 39 for securing the shell 30, and thereby the entire switch unit 4, to the chassis 23; the switch 35 being attached to the upper wall 31 by screws 40.

Figure 5:
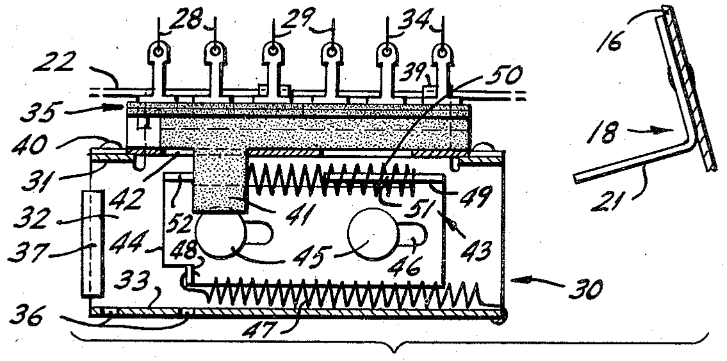
Figures 5 to 7 are elevational detail views, showing the switch and actuator in three different positions thereof.

Referring now to Figure 5: the switch 35 has a lug-shaped actuating handle or bat 41, normally freely movable but adapted to be stopped by plug 38. This bat projects into the shell 30 and is normally movable in a slot 42 formed in the wall 31. According to the invention this handle or lug 41 is normally reciprocated by a slider member 43, which comprises a flat plate 44. This plate and the entire slider are at all times longitudinally slidable, over a short distance along the wall 32, the limits of said distance being established for instance by rivets 45 on said wall and matching slots 46 in the slider. The slider 43 is normally urged toward the cabinet back closure member 16, by an extension spring 47 which has one end anchored into the lower wall 33 and another end anchored to a suitable finger 48 on the slider plate 44. Against the tension of this spring 47, the back 16 and clip 18 can freely move the slider 43 toward the front of the cabinet, which in Figure 5 is at left, thereby also acting on the switch bat in the following manner.

The slider plate 44 has a post 49, rigidly attached thereto adjacent the back end of the plate which back end is interposed between the ends of the path of the actuator clip member 21 on the cabinet closure or back 16. Movement of the plate and post incident to cabinet closure—toward left in Figure 5—is resiliently transmitted to the switch actuator lug 41 by a compression spring 50, which may be guided by a horizontal prong 51 on the post 49. On the other hand, a cabinet opening movement of the post 49 and slider 43—rightward in Figure 5—is caused by the extension spring 47 upon the opening of the back 16, and is directly transmitted to the switch actuator lug 41 by a second post 52, rigidly secured to the slider plate 44 adjacent the front end thereof.

Figure 6:
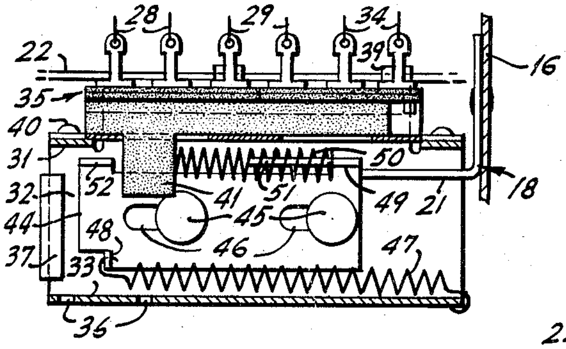

Now it is important to note that the limits of the sliding movement of the actuator lug 41 and of plate 44 and posts 49, 52 are so selected—for instance by suitable placement of the rivet and slot means 45, 46—that one of the prongs of the plug 38, when this plug is inserted in the openings 36, directly interferes with forward sliding of the switch actuator lug 41. It remains possible, however, to slide the actuator plate 44 forward; the spring 50 is then compressed to a relatively great extent, see Figure 7, while it is only slightly compressed, in the same forward position of the back closure, in case that the lug 41 is unimpeded, see Figure 6. Thus the present, combined switch is operatively moved by back 16 or spring 47, but can be made inoperative for the first-mentioned movement by the plug 38.

In operation, accordingly, the receiver may be connected either to the battery 27 by the conductors 29 (Figures 1 and 7 and broken-line position of Figure 8), or to domestic A. C. supply by the cord 28 (Figures 2 and 6 and full-line position of Figure 8). However, for actually supplying the receiver with the A. C. lines (Figure 8), additional simple but definite conditions must be fulfilled. In the first place, before the A. C. cord 28 can be either removed from or replaced in the receiver (Figure 2), the back closure 16 must be opened; at this time and by virtue of this opening, the A. C. connections are broken (Figure 8). It is additionally necessary for effective A. C. connection that the back 16 be positively closed and that accordingly (Figure 6) the clip member 21, by means of post 49 and spring 50, shift the switch actuator lug 41 forwardly, or as shown leftwardly, thereby connecting the A. C. lines and establishing the A. C. operating position of the switch 35.

Since the present receiver is not connected to any wire carrying A. C. potential until the back 16 has been closed (Figure 5), the user is fully protected from electrical shock so long as he can possibly touch any of the operative parts of the chassis 23 which in or due to normal operation may be on A. C. potential. This is true, whether he opens the back with the A. C. plug inserted in a line source socket, or at any other time.

Figure 7:
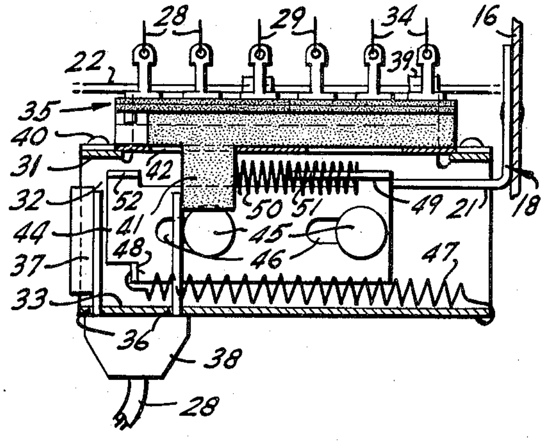

The operative D. C. position of the switch 35 is established (Figure 8) when cover 16 is open, the switch actuator lug 41 is in backward position and the A. C. line 28 thus is disconnected. However, of course, it is desirable that the battery operation should be possible also when the cabinet is closed, particularly after disconnecting the A. C. plug from the A. C. source and storing this plug. Therefore the backward position of the actuator lug 41 can be established with the back 16 either open or closed. It is established automatically by the extension spring 47, whenever the back is open (Figure 5); and the same backward position of the lug 41 can be maintained, in spite of forward position of the members 16, 21, 49, by insertion of the plug 38 in the openings 36 (Figure 7). In this latter position, one prong of this plug prevents A. C. connection even when the receiver back 16 is closed and the slider 43 in forward position.

This insertion of the plug 38 in openings 36 can be effected by the user with complete safety, the back 16 being inherently open and the A. C. lines broken at this time (Figure 8). It can also be done with perfect ease and readiness, since gathering and storing the free end of the cord 28 is an obvious and normal operation, when the cord is not used for obtaining power supply. In the receiver cabinet, the openings 36 provide an obvious and convenient holding means for the power plug 38 at the end of this cord. It may not even be necessary to provide very special instructions as to the insertion of the plug, since it was usual in previous, portable receivers—although for a quite different purpose and in conjunction with a quite different mechanism—to insert the power plug in a socket within the receiver, which socket had the same outer appearance that may be given to the openings 36.

While only a single embodiment of the invention has been described, it should be understood that the details thereof are not to be construed as limitative of the invention, except insofar as set forth in the following claims.

I claim:

1. In switching apparatus for selectively connecting an electrical device to different sources of current, including one source which can be connected to the device by an extension cord attached to the device and ending in a plug: closure means for the device; a two-position switch in the device, arranged in a first position to complete a circuit including said one source and in the second position to break said circuit and complete a circuit including another source; an actuator member for said switch, yieldingly biased to move the switch into the second position; means comprising the closure means and arranged on closure thereof to move said actuator member, against the biasing thereof, to yieldingly move the switch into the first position; and means comprising said plug for blocking the yielding movement of the switch into the first position.

2. In apparatus as described in claim 1, the feature that said one source has relatively high potential and that the switch is arranged in the second position to disconnect said one source entirely from the device.

3. In a portable A. C./D. C. broadcast receiver: a receiver case having a closure member; a switch in the case, mechanically and electrically connected to one end of a cord the other end of which has a plug for electrically connecting the receiver to an A. C. outlet, the switch being arranged in an A. C. position to electrically connect said cord to the receiver and in a D. C. position to electrically disconnect it and connect a D. C. battery within the case to the receiver; and actuating mechanism for said switch, comprising a D. C. actuator for normally biasing the switch to the D. C. position, and an A. C. actuator secured to the closure member for resiliently forcing the switch against the D. C. actuator to the A. C. position, subject to blocking of the movement of the switch to the A. C. position by means comprising said plug.

4. In apparatus as described in claim 3, a link intermediate said actuators, the D. C. actuator being a spring for moving said link, and directly thereby said switch, to the D. C. position, and the A. C. actuator being a clip on the closure member for moving said link, and resiliently thereby said switch, to the A. C. position.

5. In apparatus as described in claim 4, the feature that said switch has a slidable handle, that said link and handle are slidable in directions parallel with one another, and that the closure member is arranged to move the A. C. actuator in an arc-shaped path, one end of which terminates in the direction in which the link is slidable.

References Cited in the file of this patent

UNITED STATES PATENTS

| | | |
|---|---|---|
| 2,229,729 | Emde | Jan. 28, 1941 |
| 2,473,194 | Chou | June 14, 1949 |